United States Patent [19]

Wallace et al.

[11] 3,944,107

[45] Mar. 16, 1976

[54] CLOSURE FASTENING MEANS

[75] Inventors: John Bernard Wallace, Ickenham; Frederick William Ballard, Denham, both of England

[73] Assignee: TRW Inc., Cleveland, Ohio

[22] Filed: Jan. 13, 1975

[21] Appl. No.: 540,337

[30] Foreign Application Priority Data

Jan. 17, 1974 United Kingdom.................. 2303/74

[52] U.S. Cl................................. 220/326; 220/323
[51] Int. Cl.².......................................... B65D 45/16
[58] Field of Search ........... 220/306, 307, 323, 324, 220/326

[56] References Cited
UNITED STATES PATENTS 2,626,080  1/1953  Fernberg............................ 220/326

*Primary Examiner*—George T. Hall
*Attorney, Agent, or Firm*—James R. O'Connor

[57] ABSTRACT

A plug or closure for closing and substantially sealing an aperture in a vehicle body panel. The plug comprises a plate portion and a resilient spring element carrying a plurality of resilient snap-engaging legs. The plate portion and the spring are separate and can be formed from different materials. The plate portion has an undersurface and one or more bosses in the undersurface defining a plurality of side walls. The spring has a body integral with the legs defining a plurality of edges and the spring is attached to the plate by forcing the body of the spring between or over the bosses or boss respectively so that the edges of the body of the spring frictionally engage the side walls of the boss or bosses. The plug may be provided with a ring of sealing material on the periphery of the undersurface of the plate.

11 Claims, 16 Drawing Figures

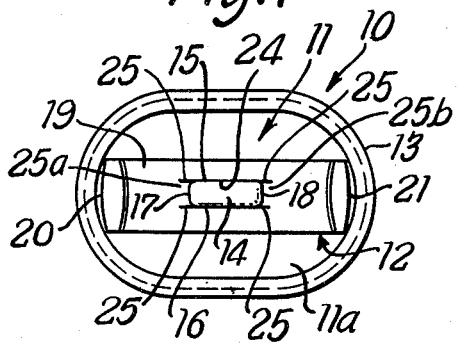
Fig.1
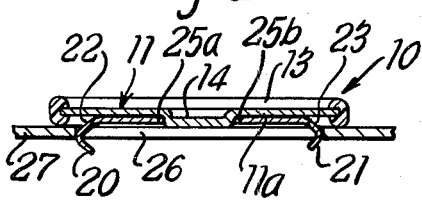
Fig.2
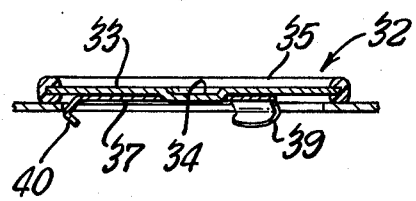
Fig.3
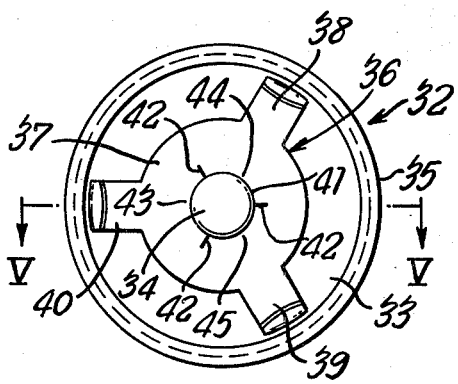
Fig.4
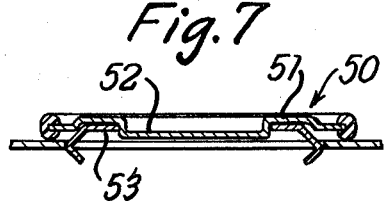
Fig.5
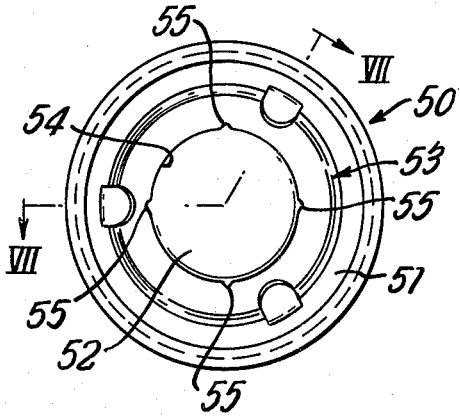
Fig.6
Fig.7

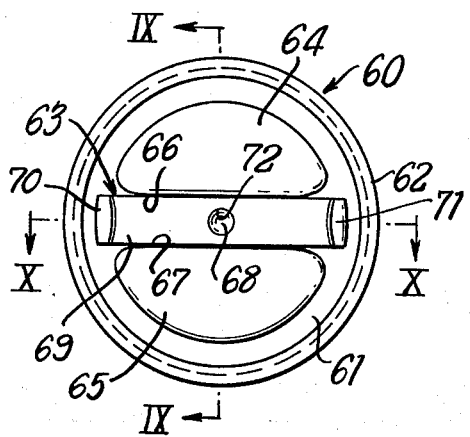
Fig.8
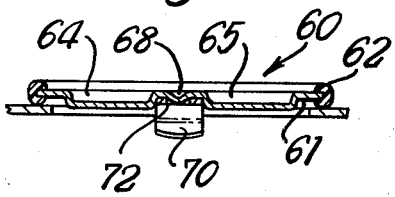
Fig.9
Fig.10
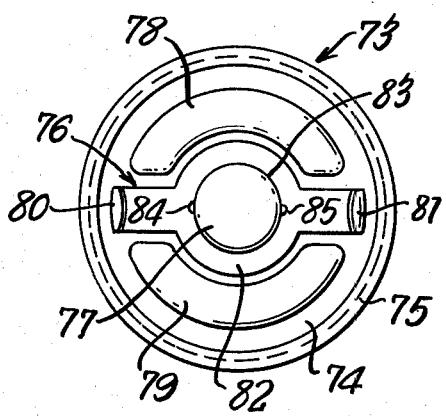
Fig.11
Fig.12
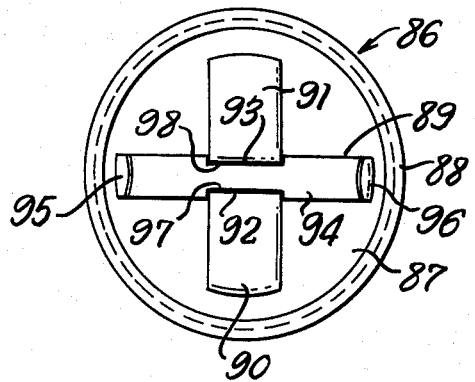

CLOSURE FASTENING MEANS

BACKGROUND OF THE INVENTION

The present invention relates to an improved plug or closure for closing and sealing an aperture in a thin metal panel such as the body panel of a vehicle.

It is known to provide a plug comprising a metal plate portion and a plurality of resilient legs which are formed integrally with the plate portion. This has the disadvantage that the legs and the plate portion must be formed from the same material and in some applications, for instance where the plate portion has to be formed from a substantially heavy gauge metal, this is a serious disadvantage.

It is also known to form the resilient legs of a plug separately from the plate portion and then rivet or stake them to the plate portion. This method of manufacture has the disadvantages that it is expensive, it presents problems in aligning and positioning the individual legs in relation to the plate portion and is not generally acceptable.

It is therefore an object of the present invention to provide a plug or closure comprising a plate portion and a plurality of legs which are separate from the plate portion but which can be quickly and easily attached to the plate portion.

STATEMENT OF THE INVENTION

The present invention provides a plug for closing an aperture in a panel comprising a generally flat metal plate adapted to cover the aperture in the panel, an undersurface on the plate, at least one boss in the undersurface of the plate defining at least two spaced sidewall portions a resilient metal spring comprising a body portion attached to the undersurface of the plate and at least two resilient legs depending from the undersurface of the plate and adapted for snap-engagement through the aperture in the panel, wherein the body portion is provided with at least two spaced edge portions in frictional engagement with the said at least two spaced sidewall portions of the boss to retain the spring and the plate together.

DESCRIPTION OF THE DRAWINGS

FIG. 1 is a plan view of a closure according to the present invention,

FIG. 2 is an elevation in section showing the closure of FIG. 1 mounted in an aperture in a panel, FIG. 3 is a plan view of a detail of a modification of the closure shown in FIG. 1, FIG. 4 is a plan view of a closure forming a further embodiment of the present invention, FIG. 5 is a section taken on the line V—V of FIG. 4 showing the closure mounted in an aperture in a panel, FIG. 6 is a plan view of a closure forming a third embodiment according to the present invention, FIG. 7 is a section taken on the line VII—VII of FIG. 6 showing the closure mounted in an aperture in a panel.

FIG. 8 is a plan view of a closure forming a fourth embodiment of the present invention, FIGS. 9 and 10 are sections taken on the lines IX—IX and X—X respectively of FIG. 8 and showing the closure mounted in an aperture in a panel, FIG. 11 is a plan view of a closure forming a fifth embodiment according to the present invention, FIG. 12 is a plan view of a closure forming a sixth embodiment of the present invention.

DESCRIPTION OF THE PREFERRED EMBODIMENTS

Figure 13:
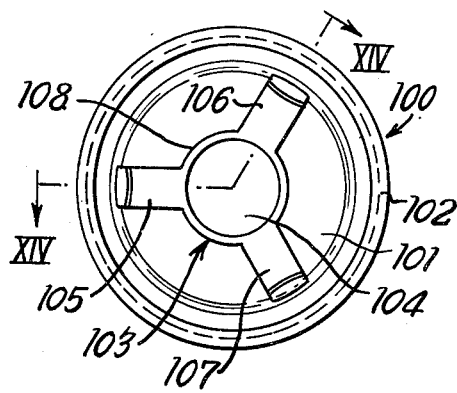
FIG. 13 is a plan view of a closure forming a seventh embodiment according to the present invention.
Figure 14:
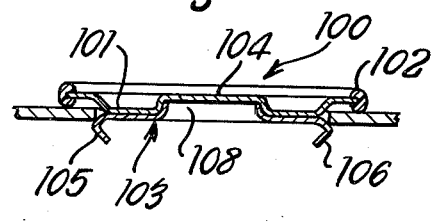
FIG. 14 is a section taken on the line XIV—XIV of FIG. 13 but showing the closure mounted in an aperture in a panel.

In FIGS. 1 and 2 a plug closure is indicated generally at 10 which comprises a plate portion 11, a spring 12 attached to the undersurface 11a of the plate and a sealing ring 13.

The plate portion 11 is approximately oblong in shape and is formed from mild steel of a gauge which will be determined by the size of the plate portion and the strength and rigidity required in the plate portion of the plug. A boss 14 is formed in the undersurface 11a of the plate portion and at the center of the plate portion, the boss 14 being rectangular in cross-section and having two parallel side walls 15 and 16 and two parallel end walls 17 and 18.

The sealing ring 13 is formed from a synthetic plastics material, for instance a polythene copolymer and it can either be sprung into position onto the rim of the plate portion or it can be insert moulded onto the plate portion.

The spring 12 comprises a substantially flat body 19 and integral legs 20 and 21. The legs are inclined outwardly from opposite ends of the body 19 and are bent at right-angles intermediate their lengths so as to form sloping shoulders 22 and 23 respectively adjacent the body 19. A rectangular aperture 24 is sheared from the center of the body 19 and defined by four side edges. Four slits 25 are formed in the body as continuations of the longer sides of the aperture 24 and define two tongues 25a and 25b.

The width of the aperture 24 in the spring 12 is the same as the external width of the boss 14 in the plate portion 11 and the spring 12 is attached to the plate portion 11 by pressing the spring over the boss 14 so that the boss enters the aperture 24 in the body 19 of the spring. The length of the aperture 24 is slightly less than the external length of the boss 14 and the tongues 25a and 25b are flexed as the boss 14 enters the aperture 24, so that the end edges of the tongues frictionally engage the end walls 17 and 18 of the boss to resist removal of the spring from the plate portion when the spring has been pressed fully home over the boss with the body 19 of the spring flat against the plate portion 11.

When the spring has been assembled on the plate portion 11, the plug 10 is used as shown in FIG. 2 to close an aperture 26 in a panel 27 by offering the legs 20 and 21 up to the aperture. The legs 20 and 21 are then sprung through the aperture so that the rim of the aperture is clamped between the shoulders 22 and 23 of the legs and the sealing ring 13 on the rim of the plate portion thereby mounting the plug 10 securely in the aperture 26 so that the sealing ring forms a seal against the panel 27.

The plug 10 is particularly useful for closing an aperture in a vehicle body panel before the panel is passed through a vehicle paint oven. In such an application, the sealing ring can be formed from a plastics material which will flow when heated to the temperature normally achieved in a vehicle paint oven of 140°C to 170°C.

Initially, the plug provides an effective mechanical seal of the panel aperture which is substantially air, water and dust-tight. Subsequently, when the panel and the plug are passed through the paint oven, the material of the sealing ring flows to fill any irregularities in the panel. The sealing ring material then cools, hardens and bonds the plate portion 11 to the panel 27. Thereafter a complete seal is achieved and the plug is securely held in place by the bonded sealing material as well as the mechanical lock achieved by the legs 20, 21.

FIG. 3 illustrates a detail of a modification 12a of the spring 12 which is shown in FIG. 1, and in which the spring 12a has a body 19a formed with a plurality of slits 25a extending outwardly generally diagonally from the corners of the aperture in the body 19a thereby forming four tongues 28, 29, 30 and 31 which will flex and bite into the side walls of the boss 14 in the plate portion.

FIGS. 4 and 5 illustrate a plug 32 which comprises a plate portion 33 having a circular central boss 34, a sealing ring 35 and a spring 36.

The spring 36 comprises a body 37 and three integral legs 38, 39 and 40. The body 37 of the spring is formed with a circular central aperture 41 of the same diameter as the external diameter of the boss 34 in the plate portion 33 and with three equi-angularly spaced radial slits 42 extending outwardly from the aperture 41.

The spring 36 is frictionally attached to the plate portion 33 by forcing the body 37 of the spring over the boss 34 so that the edge of the aperture 41 in the body 37 of the spring bites into the side walls of the boss 34 to retain the spring on the plate portion 33. The slits 42 in the body 37 of the spring form three tongues 43, 44 and 45 respectively around the aperture 41 and these tongues will flex as the spring is pressed onto the boss 34.

The plug 32 is used as shown in FIG. 5 in the same manner as the plug 10 by snap-engaging the legs through a circular aperture in a panel.

FIG. 6 illustrates a plug 50 which is similar to the plug 32 except insofar as it is has a body portion 51 formed with a boss 52 of a substantially larger diameter, relative to the overall diameter of the plug then the boss 34 of the closure 32. In addition, the plug 50 includes a spring 53 having a central circular aperture 54 adapted to fit over the boss 52. Four notches 55 are formed in the edge of the aperture 54 in the spring 53 so as to give some flexibility to the edge of the aperture 54 and so as to facilitate gripping engagement of the edge of the aperture 54 against the external wall of the boss 52. In all other respects the plug 50 is similar to the plug 32 and is used in the same manner and as shown in FIG. 7 to close a circular aperture in a panel.

FIG. 8 illustrates a plug 60 which comprises a circular plate portion 61, a sealing ring 62 attached to the periphery of the plate portion 61 and a spring 63. The plate portion 61 is formed with two spaced bosses 64 and 65 having facing side walls 66 and 67 respectively which define a channel therebetween. A dimple 68 is formed at the center of the plate portion 61 between the side walls 66 and 67 of the bosses 64 and 65.

The spring 63 comprises a body 69 and two similar legs 70 and 71 and an aperture 72 is formed at the center of the body 69 of approximately the same diameter as the dimple 68 in the plate portion.

In order to attach the spring 63 to the plate portion 61, the body 69 of the spring is forced downwardly between the side walls 66 and 67 so that the aperture 72 in the body 69 of the spring locates over the dimple 68.

The width of the body 69 of the spring is slightly greater than the gap between the side walls 66 and 67 of the plate portion 61 so that the body has to be forced down between the side walls and thereafter grips the side walls to retain the spring in position on the plate portion.

The plug 60 is used in the same manner as the plug 32 or the plug 50 to close a circular aperture in a thin metal panel as shown in FIGS. 9 and 10 by snap-engaging the legs 70 and 71 through the aperture in the panel so as to trap the rim of the aperture between the legs and the sealing ring 62. The outer side walls of the bosses 64 and 65 are part cylindrical and assist in locating the plate portion in the aperture.

In the embodiment shown in FIGS. 8 and 10, the dimple 68 serves to locate the spring, lengthwise between the bosses 64 and 65 and the side walls 66 and 67 retain the spring in position. In an alternative embodiment the width of the spring can be such that it is a loose fit between the side walls and the diameter of the aperture in the spring can be such that the dimple 68 in the plate portion is a force-fit through the aperture. The spring is thus retained on the plate portion by the biting engagement of the rim of the aperture in the spring on the dimple in the plate portion. If necessary, the dimple can comprise a substantially cylindrical extrusion and the aperture in the spring can have a tapered edge or rim portion.

FIG. 11 illustrates a plug 73 which comprises a plate portion 74, a sealing ring 75 mounted on the periphery of the plate portion 74 and a spring 76.

The plate portion 74 is formed with a central circular boss 77 and two part annular bosses 78 and 79 and the spring 76 comprises two arms 80 and 81 and an annular body 82, which is shaped to fit over the boss 77. The annular body 82 of the spring has a central aperture 83 and two diametrically positioned notches 84 and 85. The diameter of the aperture 83 is slightly less than the external diameter of the boss 77 so that the body 82 is a force fit over the boss 77 and the edges of the aperture 83 thereafter bite into the wall of the boss 77 to resist removal of the spring from the plate portion. The arms 80 and 81 are located between the facing ends of the bosses 78 and 79 which thus serve to locate the spring and to resist rotation of the spring relative to the plate portion.

FIG. 12 illustrates a plug 86 which comprises a plate portion 87, a sealing ring 88 attached to the periphery of the plate portion 87 and a spring 89.

The plate portion is formed with two generally rectangular bosses 90 and 91 formed with spaced facing walls 92 and 93 respectively.

The spring 89 comprises a body 94 and two similar arms 95 and 96. The body 94 of the spring is formed with recesses 97 and 98 respectively in its side edges and is adapted to be forced between the bosses 90 and 91 with the bosses 90 and 91 located in the recesses 97 and 98 respectively. The width of the body 94 of the spring in the region between the recesses 97 and 98 is slightly greater than the gap between the walls 92 and 93 of the bosses 90 and 91 respectively so that the spring is a force fit between the bosses 90 and 91 and the parallel edges of the recessed portions of the body 94 bite into the walls 92 and 93 of the plate portion to resist removal of the spring from the plate portion. The width of the recesses 97 and 98 is only slightly greater than the width of the bosses 90 and 91 so that the bosses centralise the spring on the plate portion.

In an alternative form of the spring 89, the width of the body 94, between the recesses 97 and 98 can be less than the gap between the walls 92 and 93 and the width of the recesses 97 and 98 reduced so that the side edges of the recesses grip the side walls of the bosses 90 and 91 to mount the spring on the plate portion. If required, slits can be formed in the body portion 94 extending outwardly from the corners of the recesses 97 and 98 so as to form resilient tongues which ride over the side walls of the bosses 90 and 91 as the spring is applied to the plate portion and thereafter bite into the side walls of the bosses to resist removal of the spring from the plate portion.

FIG. 13 illustrates a plug 100 which comprises a circular plate portion 101, a sealing ring 102 attached to the periphery of the plate portion 101 and a spring 103.

The plate portion 101 is formed with a circular depression 104 which has a cylindrical internal wall.

The spring 103 comprises three similar legs 105, 106 and 107 and a body 108 in the form of a cylindrical collar which is integral with the legs 105 to 107.

The external diameter of the body 108 is slightly greater than the internal diameter of the cylindrical depression 104 and the spring 103 is attached to the plate portion 101 by forcing the body 108 of the spring into the depression 104 so that the body 108 grips the wall of the depression 104 and resists removal of the spring from the plate portion.

If required, the body 108 of the spring 103 can be tapered to provide an easy lead-in to the depression 104 in the plate portion, or alternatively it can be in the form of a split collar so that it can be resiliently compressed in a radial sense for insertion into the depression 104 where it will expand and grip the wall of the depression to resist removal thereafter. The body 108 can also be formed with external prongs which engage the wall of the depression to resist separation of the spring from the plate portion.

Figure 15:
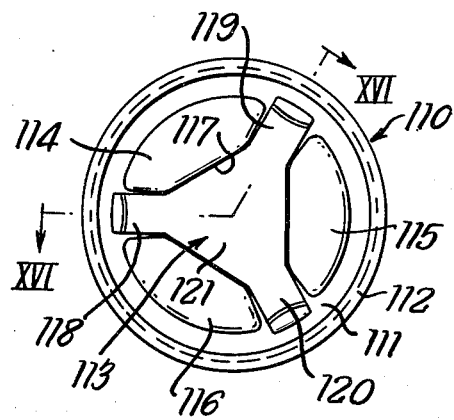
FIG. 15 is a plan view of a closure forming an eighth embodiment of FIG. 14 according to the present invention.
Figure 16:
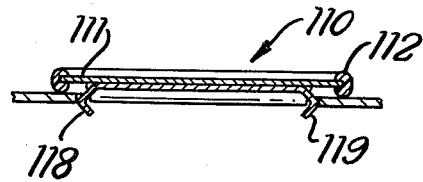
FIG. 16 is a section taken on the line XVI—XVI of FIG. 15 but showing the closure mounted in an aperture in a panel.

FIGS. 15 and 16 illustrate a plug 110 which comprises a body portion 111, a sealing ring 112 attached to the periphery of the plate portion 111 and a spring 113.

The plate portion 111 is formed with three spaced bosses 114, 115 and 116 which define an approximately triangular central depression 117.

The spring 113 comprises three legs 118, 119 and 120 and a central approximately triangular body 121.

The spring is attached to the plate portion 111 by pressing the body 121 of the spring downwardly into the central aperture 117 with the legs 118, 119 and 120 located within the spaces between adjacent bosses 114, 115 and 116 in the plate portion.

The dimensions of the body 121 of the spring is such that the body is a force fit into the central depression 117 in the plate portion whereby the three edges of the body 121 will bite into and grip the side walls of the bosses 114, 115 and 116 so as to resist removal of the spring from the plate portion.

It will be seen from the above that we have disclosed herein several embodiments of the present invention, in all of which a plug comprises a plate portion and a resilient spring which comprises a body and a plurality of resilient legs, the spring being frictionally attached to the plate portion by forcing the body of the spring between or over two spaced walls of the plate portion so that edges on the body of the spring bite into and grip the walls of the plate portion.

By forming the plate portion and the spring as two separate articles, the plate portion can be formed from a different material to the spring, for instance the plate portion can be formed from a relatively heavy gauge mild steel and the spring formed from a thinner gauge carbon steel which can be rendered resilient before it is attached to the plate portion. This has the advantage that the plate portion can be manufactured from a material which will give maximum strength and rigidity and the spring can be manufactured from a material which can be easily rendered resilient so as to form the spring legs of the closure.

It will be understood that the plug of the present invention can include a sealing ring of the type shown in the drawings to provide a complete seal around the aperture in the panel and the sealing ring can be formed from any suitable material.

The plate portion can be insert moulded into the ring and subsequently assembled with the spring, which is not possible if the legs are formed as an integral part of the plate portion, as is the case with many known plugs or closures. It will also be appreciated, however, that the plug of the present invention can comprise only the metal plate portion and spring for instance where it is not necessary to provide an air or watertight seal of the aperture in the panel. If the sealing ring is omitted, then the plate portion of the plug is so formed that its periphery will bear against the outer surface of the panel so as to form an approximate seal around the aperture.

The plate portion and the spring can be automatically assembled to form the plug and since both parts are relatively cheap to manufacture the plug of the present invention is economic to manufacture. It is also possible to manufacture the plate portion from a pre-coated material which will not require any further protective treatment after its assembly with the spring.

It will be understood that variations in the shape of the spring and the plate portion of the plug can be made without departing from the scope of the present invention which resides in the concept of forming the plate portion and the spring as two separate articles which are frictionally engaged together so that if required the plate portion and the spring can be formed from different materials.

It should also be understood that the terms "frictionally engaged" and "frictional engagement" as used heretofore and in the claims which follow are considered to define not only a tight, i.e., press, fit between the coupled plate and spring, but also a biting or claw-like gripping of the plate by the spring which provides for a secure attachment.

What we claim is:

1. A plug for closing an aperture in a panel comprising a generally flat metal plate adapted to cover the aperture in the panel, an undersurface on the plate, at least one boss in the undersurface of the plate defining at least two spaced sidewall portions, a resilient metal spring comprising a body portion attached to the undersurface of the plate and at least two resilient legs depending from the undersurface of the plate and adapted for snapengagement through the aperture in the panel, wherein the body portion is provided with at least two spaced edge portions in frictional engagement with the said at least two spaced sidewall portions of the boss to retain the spring and the plate together.

2. A plug as claimed in claim 1, wherein the plate is formed with a single boss defining the said two sidewall portions, the body portion of the spring is formed with an aperture of substantially the same shape as the boss and defining the said two spaced edge portions, the spring being attached to the plate with the boss extending through the aperture and the said edge portions frictionally engaging the said sidewall portions.

3. A plug as claimed in claim 2, wherein a ring of plastics sealing material is provided on the periphery of the undersurface of the plate.

4. A plug as claimed in claim 3, wherein the ring of plastics material comprises a resilient ring which is sprung onto the edge of the plate.

5. A plug as claimed in claim 4, wherein the sealing material is a plastics, heat softenable material.

6. A plug as claimed in claim 2, wherein the boss in the plate and the aperture in the body portion of the spring are circular and the spring includes at least three legs.

7. A plug as claimed in claim 1, wherein the plate is formed with a plurality of said bosses which are spaced apart, the body portion of the spring is formed with a plurality of outer edge portions, the body of the spring is located between the bosses on the plate and the said edge portions are frictionally engaged with the side wall portions of the bosses.

8. A plug as claimed in claim 7, wherein a ring of plastics sealing material is provided on the periphery of the undersurface of the plate.

9. A plug as claimed in claim 8, wherein the ring of plastics material comprises a resilient ring which is sprung onto the edge of the plate.

10. A plug as claimed in claim 9, wherein the sealing material is a plastics, heat softenable material.

11. A plug as claimed in claim 1 wherein the plate and the spring are formed from materials of different thickness.

* * * * *